June 21, 1932.　　　　T. W. KUPFER　　　　1,863,988
ASH TRAY FOR AUTOMOBILES
Filed Sept. 30, 1929
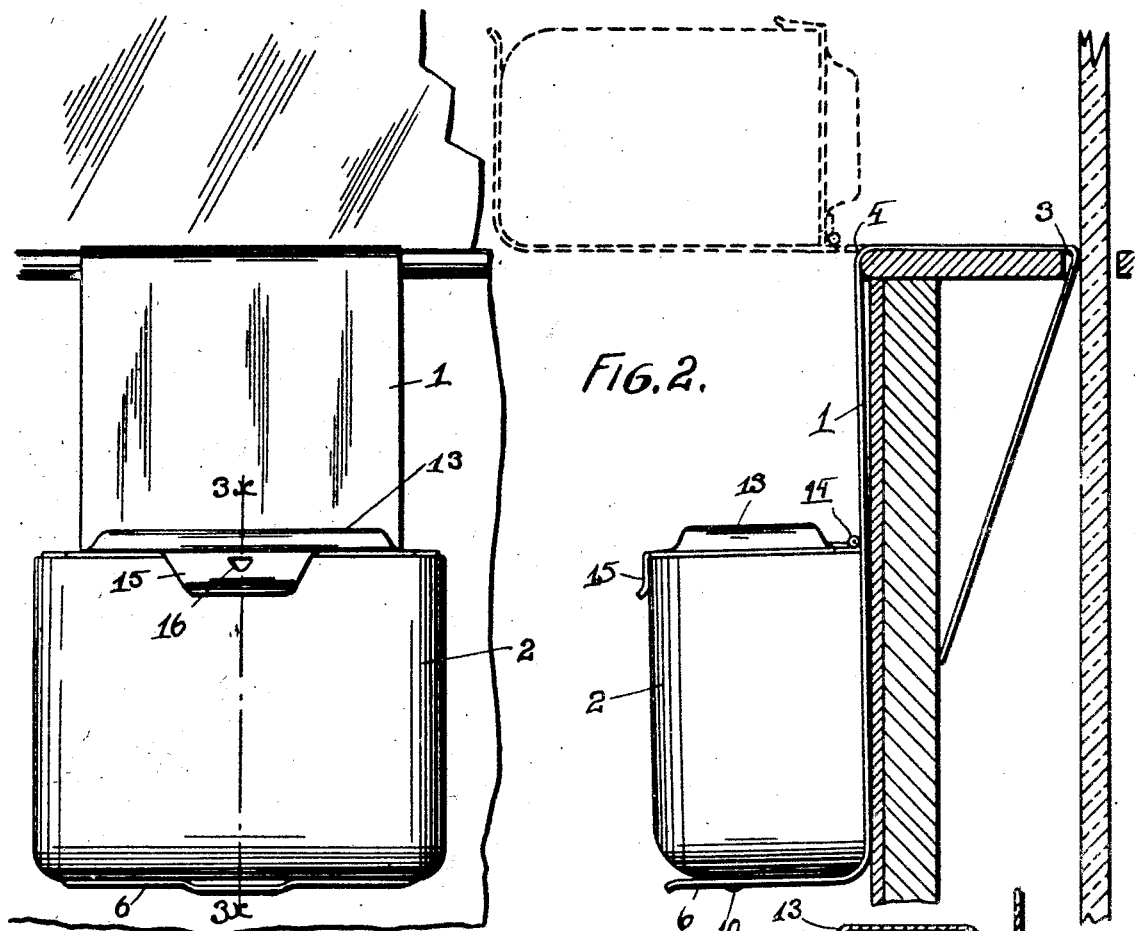
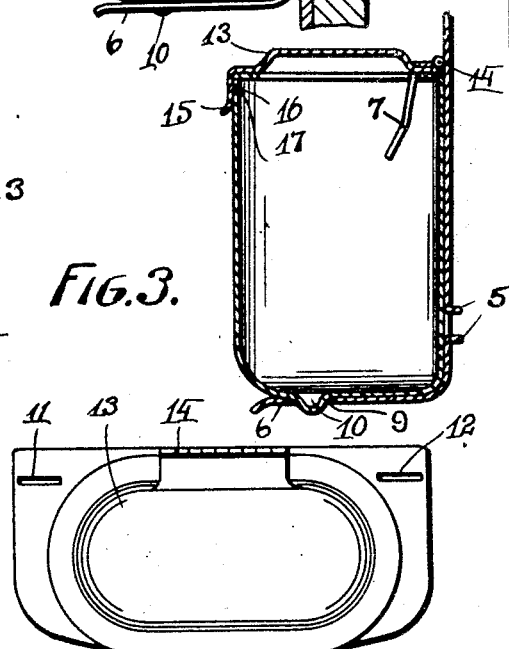
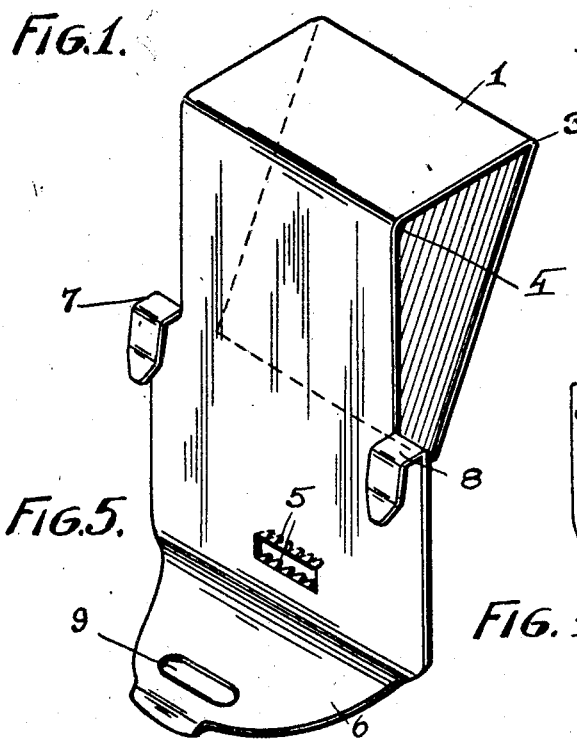
INVENTOR
THEODORE W. KUPFER
BY
ATTORNEY Patented June 21, 1932

1,863,988

UNITED STATES PATENT OFFICE

THEODORE W. KUPFER, OF ROCHESTER, NEW YORK

ASH TRAY FOR AUTOMOBILES

Application filed September 30, 1929. Serial No. 396,118.

This invention relates to ash trays for use in automobiles and has for its various objects:

To provide an ash tray which can be easily and quickly fitted to all cars.

To provide an ash tray which when fitted to the car will be firmly held in place thereon and cannot disengage itself from its anchorage.

To provide an ash tray which can be easily and quickly emptied.

To provide an ash tray for an automobile with a cover which will keep the ashes from blowing out and smother a lighted cigarette or cigar stub when placed in it.

All these and other objects of this invention will be apparent from the drawing, the specification and the appended claims forming a part thereof.

In the accompanying drawing:

Figure 1 is a front elevation of the ash tray and a portion of the automobile body to which it is attached.

Figure 2 is an end elevation of the ash tray and section of the portion of the automobile body to which it is attached.

Figure 3 is a vertical sectional view of the ash tray, the section being taken on the line $3x$—$3x$ of Figure 1.

Figure 4 is a top plan view of the ash tray.

Figure 5 is a detail perspective view of the supporting bracket of the ash tray.

In the several figures of the drawing like reference numerals indicate like parts.

The ash tray forming the subject matter of my present invention is adapted to be mounted to the sides of the inside of an automobile at any point along the ledge of any of the side windows. The ash tray is made up in two parts, the supporting bracket 1, which is attached and anchored to the window frame, and the ash tray proper 2 which is supported by the bracket 1 and is removably locked in place thereon.

The supporting bracket 1, as illustrated in perspective in Figure 5, is bent up of sheet metal which will readily lend itself to a manual bending operation which is necessary to properly fit the bracket in place on the window ledge. As illustrated in dotted lines in Figure 2 the upper portion of the bracket 1 has at first but one bend 3 provided in it. The location of the second bend is gauged according to the width of the window ledge to which the bracket is to be attached. This is done by inserting the bracket in its original form behind the window ledge up to the bend 3. The supporting bracket then projects horizontally from the window ledge as illustrated in dotted lines in Figure 2. The portion of the bracket resting on top of the window ledge is then firmly held down onto it while the remainder of the bracket is bent down over the side of the ledge until the lower portion of the bracket rests against the inside of the door or body section below the window ledge. In order to anchor the bracket in place in this position so that it cannot disengage itself after it has been bent as above described, a series of teeth 5, 5 are struck up from the bracket and project rearwardly from it. These teeth engage the upholstery of the inside of the car when the bracket is bent into its proper shape and hold the bracket from disengaging itself from the window ledge after it has been attached thereto as above described.

For the purpose of removably supporting the ash tray proper on the supporting bracket, the bracket is provided at the bottom with an outwardly projecting ledge 6 having a hole 9 therein and with a pair of hook shaped holding members 7 and 8 projecting from the bracket at a point intermediate thereof. The ash tray proper is provided with a lug 10 which is struck out from the bottom thereof and is adapted to engage into the hole 9 in the supporting ledge 6. In the top of the ash tray are provided a pair of slots 11 and 12 into which the hook shaped holding members 7 and 8 are adapted to engage. As illustrated in Figure 3 the hook shaped holding members project angularly from the bracket so as to facilitate the engagement of these members with the slots 11 and 12 in the top of the ash tray with the tray held in an angular position to permit the tray to be moved upwardly past the supporting ledge 6. After the hook shaped holding members have been engaged into the top of the ash tray the lower end of it is swung inwardly over the supporting ledge 6 until the lug 10 of the tray engages into the hole 9 in the ledge. The bracket 1 is preferably bent up of spring metal so that the supporting ledge 6 thereof acts as a spring against the bottom of the ash tray and yieldingly holds the ash tray between the supporting ledge and the hook shaped holding members. The engagement of the lug 10 with the hole 9 yieldingly locks the bottom of the ash tray to the bracket 1 and prevents its sliding out from the supporting ledge unless the ledge is depressed so that the lug can disengage itself from the hole provided therein. The ash tray can thus be readily attached or detached from the bracket 1 and when it is attached to the bracket the tray is firmly held in place thereon and cannot rattle or disengage itself on the vibration of the car.

To attach the ash tray the top thereof is first completely moved into engagement with the holding members 7 and 8 and after that the bottom of the tray is swung in over the supporting ledge until the lug 10 of the tray has snapped into engagement with the hole 9 in the ledge. To disengage the ash tray from the bracket the operation is reversed; that is the bottom of the tray is pulled out over the ledge while the ledge is sufficiently depressed to disengage the lug 10 of the tray from the hole 9 in the ledge. After the bottom of the tray has been moved clear from the ledge, the tray is pulled down until the hook shaped members 7 and 8 have been disengaged from the slots 11 and 12 in the top of the ash tray when the tray is free from the bracket.

The ash tray is closed with the cover 13 which is hinged along one edge of the top by means of the spring operated hinge 14 which yieldingly and normally holds the cover open. At the front of the cover a latch 15 is provided and from it is struck up a lug 16 which projects inwardly thereof. When the cover is closed this lug engages into a suitable hole 17 located near the top of the ash tray and holds the cover locked down onto the tray. To open the cover the latch 15 is slightly pulled out to disengage the lug 16 from the hole in the tray to release the cover and allow the spring operated hinge to raise it and uncover the ash tray.

I claim:

1. An ash tray support for use in supporting ash trays on automobile window ledges and the wall below the window ledge comprising a bracket, a horizontal supporting ledge at one end of said bracket, a flexible and bendable extension at the other end thereof adapted to engage behind the window ledge and shape itself to the top and front of the window ledge to hold said bracket in a vertical position on the inside of the window ledge, outwardly projecting teeth provided intermediate of said bracket and adapted to engage the wall below the window ledge to prevent a vertical movement of said bracket after the upper extension thereof has been shaped over the window ledge.

2. An ash tray support for use in supporting ash trays on automobile window ledges and the wall below the window ledge comprising a bracket, a horizontal supporting ledge at one end of said bracket, a flexible and bendable extension at the other end thereof adapted to engage behind the window ledge and shape itself to the top and front of the window ledge to hold said bracket in a vertical position on the inside of the window ledge, outwardly projecting teeth provided intermediate of said bracket and adapted to engage the wall below the window ledge to prevent a vertical movement of said bracket after the upper extension thereof has been shaped over the window ledge and holding means intermediate of said bracket and overhanging said supporting ledge to engage an ash tray and hold it in place on said supporting ledge.

In testimony whereof I affix my signature.

THEODORE W. KUPFER.